United States Patent [19]

Gargini

[11] 4,398,214
[45] Aug. 9, 1983

[54] WIRED TELEVISION BROADCASTING SYSTEM

[75] Inventor: Eric J. Gargini, West Drayton, England

[73] Assignee: Communications Patents Limited, London, England

[21] Appl. No.: 279,664

[22] Filed: Jul. 1, 1981

[30] Foreign Application Priority Data

Jul. 5, 1980 [GB] United Kingdom ................ 8022111

[51] Int. Cl.³ .............................................. H04N 7/16
[52] U.S. Cl. .................................. 358/118; 358/114; 455/1; 455/28
[58] Field of Search ................. 455/1, 3, 4, 45, 26–30; 358/114, 115, 116, 117, 118, 121, 123, 86

[56] References Cited

U.S. PATENT DOCUMENTS

| | | | |
|---|---|---|---|
| 2,709,218 | 5/1955 | Gabrilovitch | 455/45 |
| 3,054,857 | 9/1962 | Weiss | 358/122 |
| 3,826,863 | 7/1974 | Johnson | 358/122 |
| 3,857,997 | 12/1974 | Toonder | 358/86 |
| 3,914,534 | 10/1975 | Forbes | 358/122 |
| 4,024,575 | 5/1977 | Harney et al. | 358/118 |
| 4,222,067 | 9/1980 | Stern et al. | 358/118 |

Primary Examiner—S. C. Buczinski
Attorney, Agent, or Firm—Laurence R. Brown

[57] ABSTRACT

There is disclosed a wired television system comprising a source of television signals supplying signals to a transmission network, subscriber stations connected to the network, means for preventing reception of transmitted signals by at least one subscriber station, and means for overriding the preventing means to enable that subscriber to receive the transmitted signals. The television signals are heterodyned with a scrambling signal to provide the transmitted signals, and the scrambling signal is transmitted over the network. At the subscriber station, the transmitted signals and the scrambling signal are heterodyned to recover the television signal.

6 Claims, 4 Drawing Figures

WIRED TELEVISION BROADCASTING SYSTEM

The present invention relates to wired television broadcasting systems and in particular to such systems in which signals transmitted on some of the available channels are not freely available to subscribers.

In systems of this type subscribers may be provided with devices which enable them to view signals which are not freely available in return for an appropriate payment. For this reason channels to which the signals are applied are commonly referred to as "Pay TV" channels. Payment may be made directly into a coin-operated device at the subscribers premises or more conveniently subscribers can be periodically charged for services received in the same manner as most telephone subscribers are currently charged for their use of the telephone system.

In one known system subscribers are provided with receiving equipment including "traps" which effectively prevent the reception of signals at a particular frequency or freqencies. When a subscriber deposits the appropriate coins, or indicates acceptance of a charge, in order to view signals on a pay channel, the traps are disabled to make reception of the desired signals possible. Unfortunately, the traps impair picture quality even when disabled.

It is an object of the present invention to provide a wired television broadcasting system of the general type described above in which the picture quality is improved.

According to the present invention there is provided a wired television system comprising a source of television signals supplying signals to a transmission network, a plurality of subscriber stations connected to the network, means for preventing reception of transmitted signals by at least one subscriber station, and means for overriding the preventing means to enable said at least one subscriber to receive said transmitted signals, characterised in that the preventing means comprise means for heterodyning television signals and a scrambling signal to provide said transmitted signals, and the overriding means comprise means for transmitting the scrambling signal over the transmission network, and means associated with the subscriber station for receiving the transmitted signals and the scrambling signal and for heterodyning the transmitted signals and the scrambling signal to recover the television signals.

The term "preventing reception" is used herein to mean that signals are rendered unintelligible to a receiving subscriber station.

Preferably the overriding means comprise circuits controllable by the subscriber to selectively release the received scrambling signal to the heterodyning means associated with the subscriber station.

Preferably the scrambling signal comprises a frequency modulated carrier, the modulation preferably comprising a square wave.

The square wave may be interrupted by control signals which control the release of the scrambling signal to the heterodyning means associated with the subscriber station.

A guard signal may be added to the transmitted signals on the vestigial side of the receiver response curve to prevent unauthorised viewing of monochrome pictures and/or listening to sound in peak tuned receivers.

An embodiment of the present invention will now be described, by way of example, with reference to the accompanying drawings, in which:

FIGS. 3 and 4 show detailed circuit diagrams of components shown in outline in FIG. 1.

Figure 1:
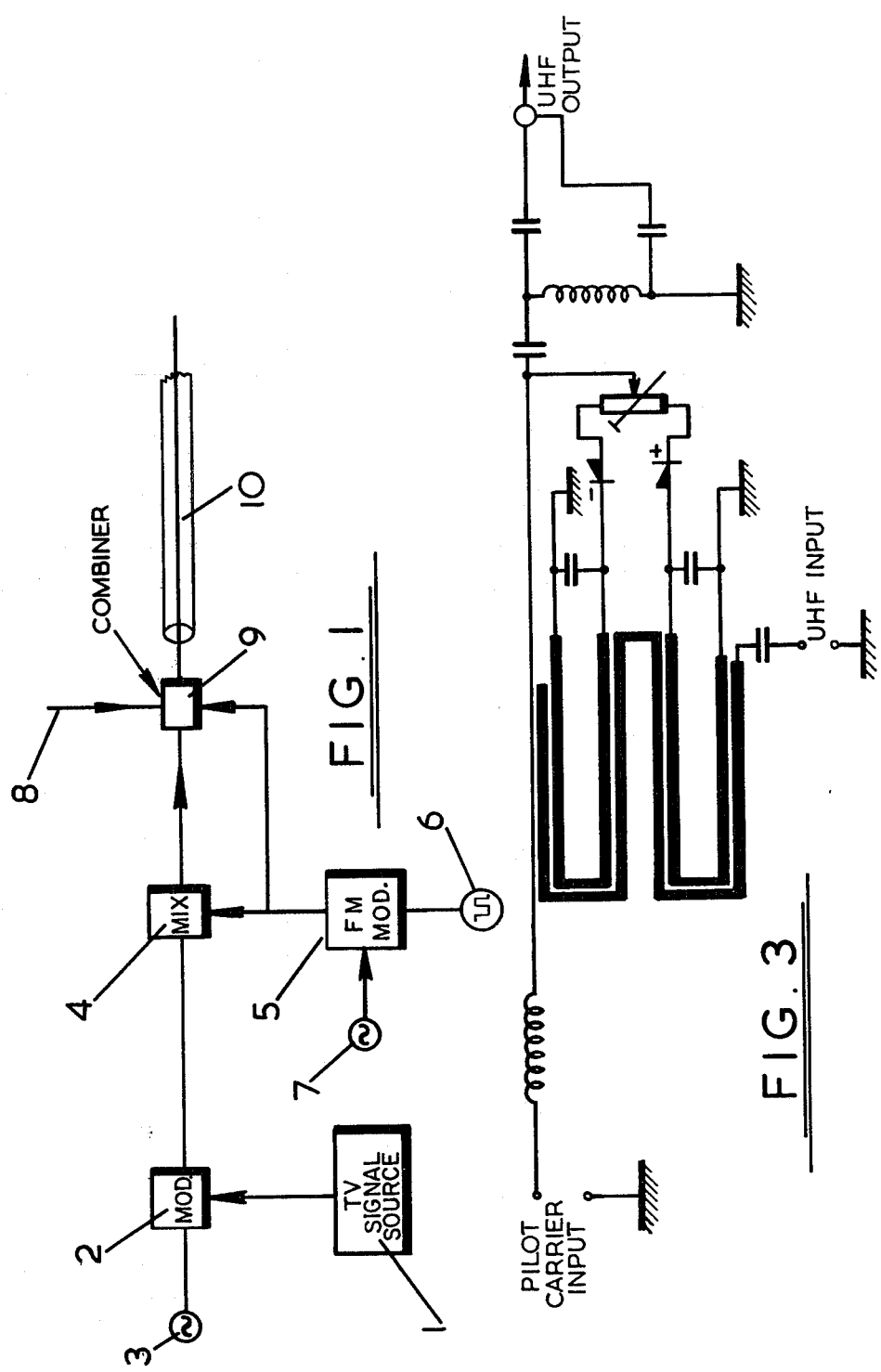
FIG. 1 shows a schematic diagram of head end transmitter equipment of a wired television system embodying the present invention.

Referring to FIG. 1 there is shown the head equipment of a wired television system embodying the present invention. A pay television signal output from a television signal source 1 such as a VCR is modulated by a UHF modulator 2 onto a UHF carrier generated by UHF carrier generator 3. The resultant modulated output is then frequency changed in a frequency changer 4 to a lower or higher frequency by heterodyning with a frequency modulated pilot carrier. The frequency modulated pilot carrier is provided by an FM modulator 5 which modulates the output of a square wave generator 6 into the output of a carrier generator 7. The outputs of the frequency changer 4, the modulator 5 and other television signal source (not shown) connected to line 8 are combined by a combiner 9 and applied to a wired network represented by coaxial cable 10.

The output from the generator 6 is chosen to cause the most interference to any receiver tuned to the frequency changed FM and AM modulated carrier output from the frequency changer 4. In the case of a 625 line system the most disturbing modulation signal appears to be a 110 Hz square wave.

The frequency of the pilot carrier provided by generator 7 may be 57 MHz, deviation 1 100 KHz, for example.

Figure 2:
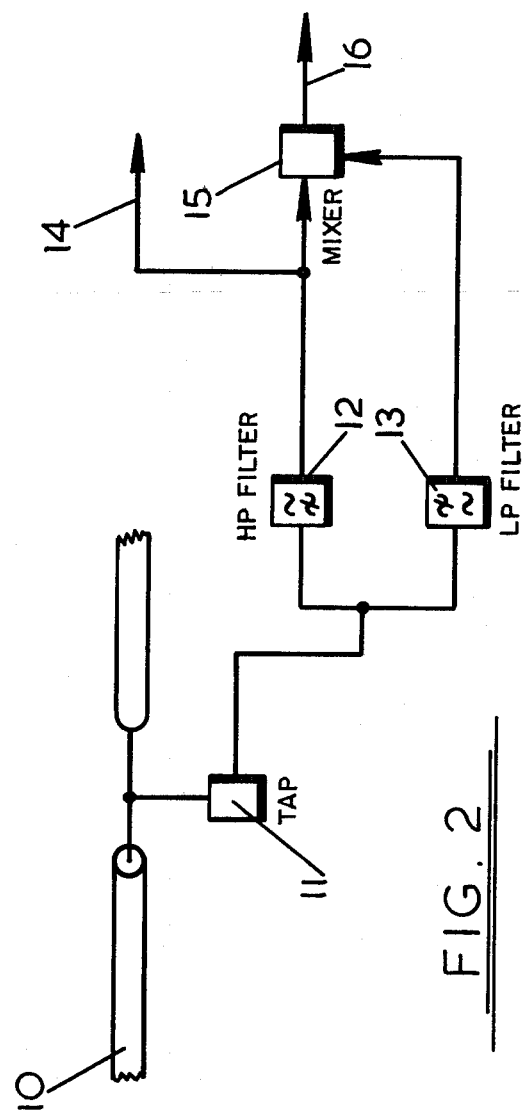
FIG. 2 shows a schematic diagram of a subscriber station of a wired television system embodying the present invention.

Referring to FIG. 2 there is shown a subscriber station of a wired television system embodying the present invention. Signals from the head end of FIG. 1 are input to the receiver from the transmission network cable 10 via a tap-off unit 11. A low pass filter 12 and a high pass filter 13 separate the frequency modulated pilot carrier from the scrambled pay television signal and "free" television channel signals, the "free" signals being applied directly to a receiver (not shown) via line 14. The scrambled pay television signal is applied by filter 12 to a frequency changer 15 which also receives the modulated pilot carrier scrambling signal from filter 13. The two inputs to frequency changer 15 are heterodyned to reproduce on output 16 the original pay television signal. This reproduced signal can then be applied to the receiver for viewing.

In the arrangement of FIG. 2, the provision of filter 12 and frequency changer 15 automatically gives access to pay television signals. A switch (not shown) could however be inserted between the filter 12 and the frequency changer 15 so that when open the frequency changer could not operate. Closure of the switch to release the pilot carrier to the frequency changer and thereby enable reception of the pay signal could be made conditional upon the making of a payment, for example by controlling the switch with a suitable coin-operated mechanism.

As a further alternative, the switch could be remotely controlled from the head end. This could be achieved by applying FM coded control signals to the pay signal channel, detecting the coded signals using an "intelligent tap", and controlling the switch accordingly. Persons skilled in wired broadcasting systems will be familiar with a variety of freely available intelligent tap systems that could be adapted for this purpose.

As noted earlier, the modulation on the pilot carrier comprises a square wave. The square wave may be interrupted by the pay television control signals to provide a simple means for transmitting control signals to the intelligent tap. The output of the generator 6 may also be randomly coded to prevent unauthorized access to the pay television channel by subscribers skilled in electronics.

It is possible for unauthorized viewers to tune receivers to peak the response at the pay television signal carrier frequency which prevents colour operation but permits acceptable viewing in monochrome and, in some receivers, reception of sound. To prevent this a guard signal may be added to the signal transmitted which is on the vestigial side of the receiver response curve when normally tuned and this causes no interference. However, it prevents unauthorised viewing by interfering with the monochrome picture in peak tuned receivers and preventing the receiver responding to the TV sound signal.

As noted earlier, the square wave modulation used in the described embodiment is 110 Hz, which is twice the field frequency plus 10 Hz. However it will be appreciated that other relationships based on other multiples of frame and line frequency are also effective.

It will be appreciated that the scrambled pay television channel signal may also be transmitted over and HF network with the pilot carrier being sent on the same but preferably a different pair of conductors in the cable.

Figure 4:
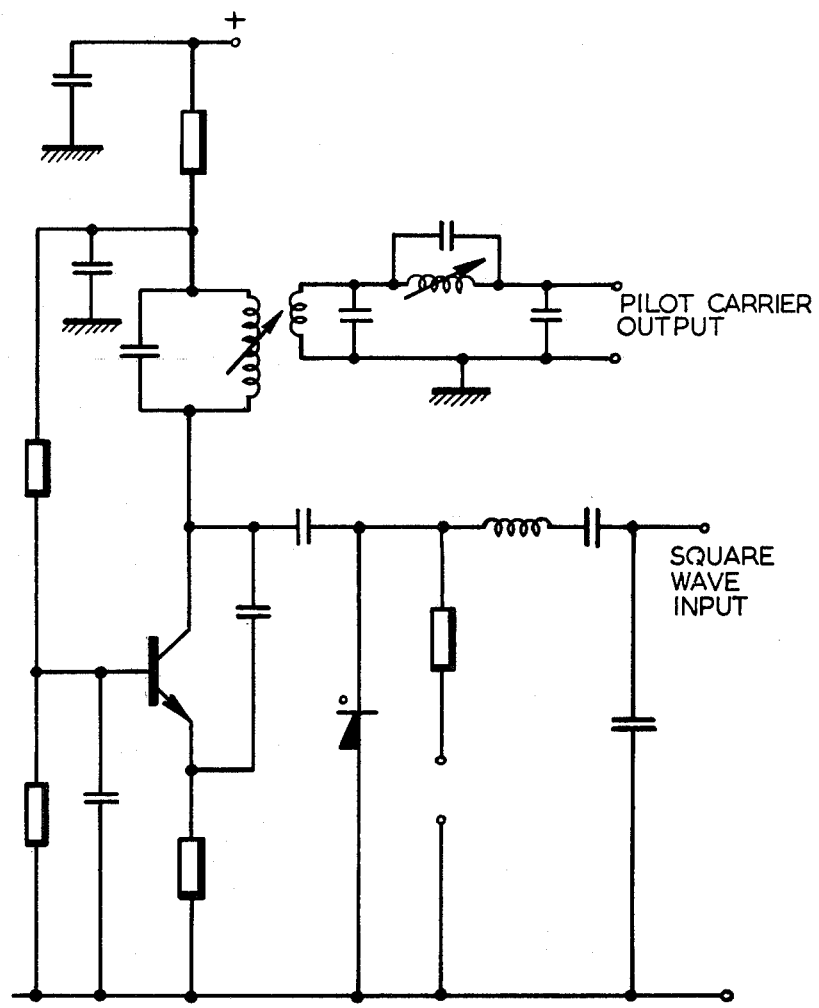

FIG. 3 shows a circuit diagram of a frequency changer suitable for use as component 4 in FIG. 1 and FIG. 4 shows a circuit diagram of a local oscillator and modulator suitable for use as components 5 and 7 of FIG. 1.

What is claimed is:

1. A wired television system comprising a source of television signals supplying signals to a transmission network, a plurality of subscriber stations connected to the network, means for preventing reception of transmitted signals by at least one subscriber station, and means for overriding the preventing means to enable said at least one subscriber to receive said transmitted signals, characterised in that the preventing means comprise means for heterodyning television signals and a scrambling signal to provide said transmitted signals, and the overriding means comprise means for transmitting the scrambling signal over the transmission network, and means associated with the subscriber station for receiving the transmitted signals and the scrambling signal and for heterodyning the transmitted signals and the scrambling signal to recover the modulated television signals.

2. A wired television system according to claim 1, characterised in that the overriding means comprise circuits controllable by the subscriber to selectively release the received scrambling signal to the heterodyning means associated with the subscriber station.

3. A wired television system according to claim 1, characterised in that the scrambling signal comprises a frequency modulated carrier.

4. A wired television system according to claim 1 or 2, characterised in that the carrier is modulated with a square wave and that the scrambling signal comprises a frequency modulated carrier.

5. A wired television system according to claim 2, characterised in that the carrier is modulated with a square wave and that the scrambling signal comprises a frequency modulated carrier including means for interrupting the square wave with control signals which control the release of the scrambling signal to the heterodyning means associated with the subscriber station.

6. A wired television system according to either of claims 1, 2 or 5 characterized in that a guard signal is added to the transmitted signals on the vestigial side of the receiver response curve to prevent unauthorized viewing of monochrome pictures and/or listening to sound in peak tuned receivers.

* * * * *